United States Patent
Rosenau et al.

(10) Patent No.: US 6,978,650 B2
(45) Date of Patent: Dec. 27, 2005

(54) CONTACT SURFACE FOR A CRIMPING ROLLER IN A ROLL FORMING TOOL

(75) Inventors: Keith W. Rosenau, Madison Heights, MI (US); Marion A. Royse, Rockford, TN (US); Michael J. Lagerstrom, Madison Heights, MI (US); William J. Konitsney, Madison Heights, MI (US)

(73) Assignee: Schlegel Corporation, New York, NY (US)

( * ) Notice: Subject to any disclaimer, the term of this patent is extended or adjusted under 35 U.S.C. 154(b) by 213 days.

(21) Appl. No.: 10/386,038

(22) Filed: Mar. 11, 2003

(65) Prior Publication Data

US 2004/0177667 A1 Sep. 16, 2004

(51) Int. Cl.$^7$ .................................. B23P 21/00
(52) U.S. Cl. ...................... 72/211; 29/243.58; 72/466.8
(58) Field of Search ........................ 72/210, 211, 466.8, 72/466.9; 29/243.58; 492/42, 56

(56) References Cited

U.S. PATENT DOCUMENTS

| | | | |
|---|---|---|---|
| 681,960 A | * | 9/1901 | Flanigan .................... 72/466.8 |
| 2,761,199 A | | 9/1956 | Allen |
| 3,150,707 A | * | 9/1964 | Howell ......................... 72/177 |
| 3,335,592 A | * | 8/1967 | Woodling .................... 72/196 |
| 3,485,076 A | * | 12/1969 | Colburn ........................ 72/179 |
| 3,514,829 A | * | 6/1970 | Blatt ............................. 492/56 |
| 4,902,549 A | | 2/1990 | Bright et al. |
| 4,996,756 A | | 3/1991 | Bright et al. |
| 5,048,170 A | | 9/1991 | Küppers |
| 5,065,486 A | | 11/1991 | Goedderz |
| 5,068,952 A | | 12/1991 | Hennen |
| 5,072,500 A | | 12/1991 | Wagner |
| 5,237,741 A | | 8/1993 | Goedderz |
| 5,451,198 A | | 9/1995 | Lancaster |
| 5,507,226 A | | 4/1996 | Burke et al. |
| 5,864,933 A | | 2/1999 | Sheline |
| 5,875,670 A | | 3/1999 | Stojkovski et al. |
| 5,940,950 A | | 8/1999 | Galat |
| 6,219,907 B1 | | 4/2001 | Frye |
| 6,289,565 B1 | | 9/2001 | Willett |
| 6,311,378 B1 | | 11/2001 | Menguc |
| 2001/0013163 A1 | | 8/2001 | Menguc |
| 2002/0029455 A1 | | 3/2002 | Armellini et al. |

FOREIGN PATENT DOCUMENTS

| | | |
|---|---|---|
| EP | 0317086 A1 | 5/1989 |
| EP | 0437964 A2 | 7/1991 |
| GB | 2356662 A | 5/2001 |
| WO | WO 00/18601 | 4/2000 |

\* cited by examiner

Primary Examiner—Lowell A. Larson
(74) Attorney, Agent, or Firm—Brian B. Shaw, Esq.; Stephen B. Salai, Esq.; Harter, Secrest & Emery (57) ABSTRACT

A roll-forming tool for deforming a flange cap from a splayed configuration to engage a vehicle flange, the tool includes a polymeric contact surface disposed about a rigid drum. The polymeric contact surface can be in the form of a sleeve and integrally formed to the metal drum, or alternatively, the sleeve can be removeably attached to the drum for allowing replacement. The drums can be metal and configured for eccentric rotation relative to a corresponding drive shaft, thereby accommodating further variations in flange thickness.

31 Claims, 7 Drawing Sheets

CONTACT SURFACE FOR A CRIMPING ROLLER IN A ROLL FORMING TOOL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to roll forming tools for crimping an edge trim or seal onto a flange of a motor vehicle, and more particularly, to a contact surface for a crimping roller in the roll forming tool, wherein the contact surface provides the necessary friction between the roll forming tool and the edge trim or seal, while minimizing surface damage to the edge trim or seal during installation (crimping) operations.

2. Description of the Related Art

The fitting of flange mounted automotive weatherstrips encounters a number of traditional problems resulting from manufacturing tolerances in both the weatherstrip and the vehicle.

Traditional flange mounted weatherstrips include a U-shaped profile having an embedded metallic reinforcing member, wherein the U-shaped profile is presented to the flange with the legs of the U-shaped profile in a parallel orientation. An inside surface of the U-shaped profile typically included retaining fingers that project into the channel. The U-shaped profile is operably engaged with a flange by urging the U-shaped profile against the flange to seat the closed end of the U-shaped profile against the terminal end of the flange, and the retaining fingers contact the flange and resist removal.

Typically, the flange of the vehicle to which the weatherstrip is fitted usually has a predetermined thickness, or number of sheet metal layers. However, the flange often has more or less layers of sheet metal, and thus varies from the predetermined thickness. If the weatherstrip is formed to accommodate the predetermined thickness, the weatherstrip may be too wide for a flange of fewer metal layers, yet too narrow for a flange of more metal layers. As a result, the weatherstrip may not grip satisfactorily where the flange is of fewer layers and conversely, if the flange is of excess layers, the weatherstrip may be extremely difficult to install.

These problems have been recently addressed by modifying the traditional flange-gripping portion of the weatherstrip. Specifically, the traditional U-shaped cross section of the gripping portion on the weatherstrip is formed in a splayed configuration. That is, the legs of the profile are not presented to the flange in a parallel orientation, but rather a spread configuration. The spread, or splayed, configuration allows the flange gripping portion of the weatherstrip to be initially presented to the flange with a reduced insertion force.

To operatively engage the splayed flange gripping portion, a roll forming tool is employed to deform the internal reinforcement member, such as the metal carrier, so as to engage and be retained upon the flange of the vehicle.

The roll forming tool incorporates a pair of crimping rollers rotatable in opposite directions about spaced axes, which may be parallel to one another or alternatively can be adjustable relative to one another. At least one of the rollers is rotated by any of a variety of motors, including pneumatic or electric, in conjunction with corresponding gearing between a drive shaft and the roller.

In use, the roll-forming tool is applied to the splayed flange gripping portion, and when the rollers are rotating, the rollers drive themselves onto the flange-gripping portion of the seal and by virtue of the parallel or generally parallel relationship of the rolling surfaces between the rollers will cause the flange gripping portion to be crimped into a clamping engagement on the flange. The crimping of the splayed U-shaped flange-gripping portion deforms the internal carrier and thus retains the weatherstrip relative to the flange.

However, it has been found that while the splayed flange-gripping construction offers significant advantages and in the accommodation of varying flange thickness, there is a significant tendency of the rollers to embed into the surface of the seal (upon excessive flange thickness) or spin relative to the seal without corresponding movement along the length of the seal, thereby marring the surface of the strip. Such marring, if on the edge trim portion can reduce the esthetic appeal, and if upon the sealing portion, can damage the seal to reduce its effective sealing capacity.

Therefore, the need exists for a contact surface of a crimping roller, or structure, that can reduce damage to the seal being installed. The need also exists for a contact surface to assist in accommodating a variety of flange thickness encountered by the roll forming tool.

BRIEF SUMMARY OF THE INVENTION

The present invention provides a contact surface for a crimping roller in the roll forming tool. The contact surface can be permanently or releasably connected to a drum of the respective crimping roller. Preferably, the contact surface is formed of a polymeric material, and can provide a smooth or contoured surface for contacting the flange cap.

In one configuration, each crimping roller includes metal drum to which the polymeric contact sleeve is connected. The contact sleeve can be molded to the drum, or molded through radial apertures in the drum.

In a further configuration, the drum can be connected to a corresponding drive shaft by a compressible interconnection. The compressible interconnection is selected to provide for movement of the drum between a concentric position and an eccentric position relative to the corresponding drive shaft.

DETAILED DESCRIPTION OF THE INVENTION

Figure 1:
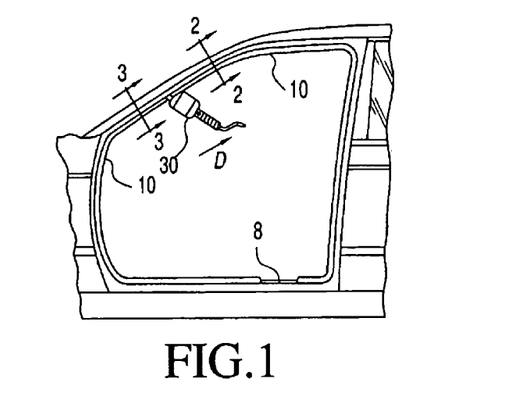
FIG. 1 is side elevational view showing a roll forming tool operably installing a splayed edge trim.
Figure 2:
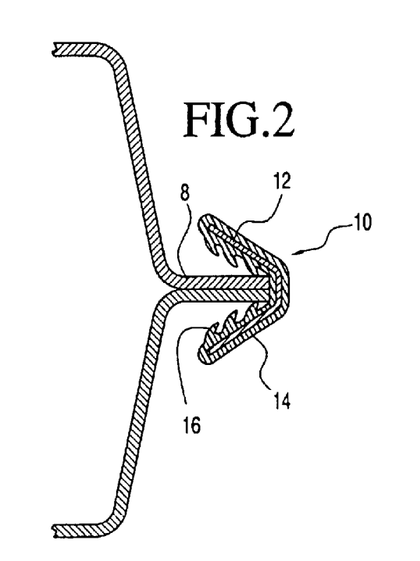
FIG. 2 is a cross sectional view taken along lines 2—2 of FIG. 1.
Figure 3:
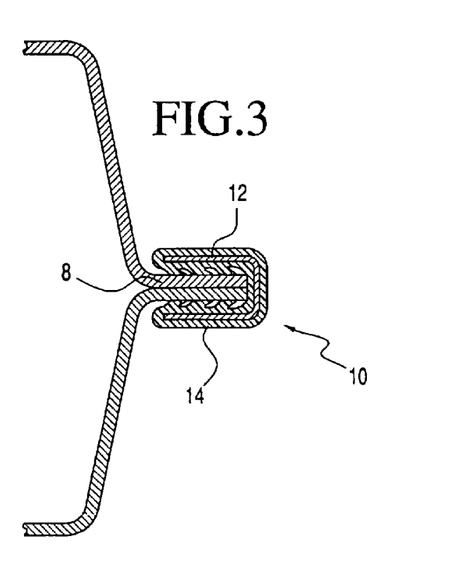
FIG. 3 is a cross sectional view taken along lines 3—3 of FIG. 1.

Referring to FIGS. 1 and 2, a roll forming tool 30 is shown operably engaging a splayed flange cap 10 on a vehicle flange 8.

Typically, an edge trim or seal includes the generally U-shaped flange cap 10. The flange cap 10 typically includes a reinforcing member 12 at least partially surrounded by a polymeric body 14 to define the U shape profile.

The polymeric material 14 of the flange cap 10 can be any of a variety of materials such as thermoplastics, elastomers or combinations thereof.

A typical reinforcing member 12 has sufficient rigidity to be crimped onto the flange and operably retain the flange cap 10. The reinforcing member has a U shaped profile corresponding to the flange cap 10. The reinforcing member 12 can be a plastic, metal, composite or alloy. Satisfactory reinforcing members 12 include a metal core, a knitted wire, a lanced metal or a stamped metal.

Figure 5:
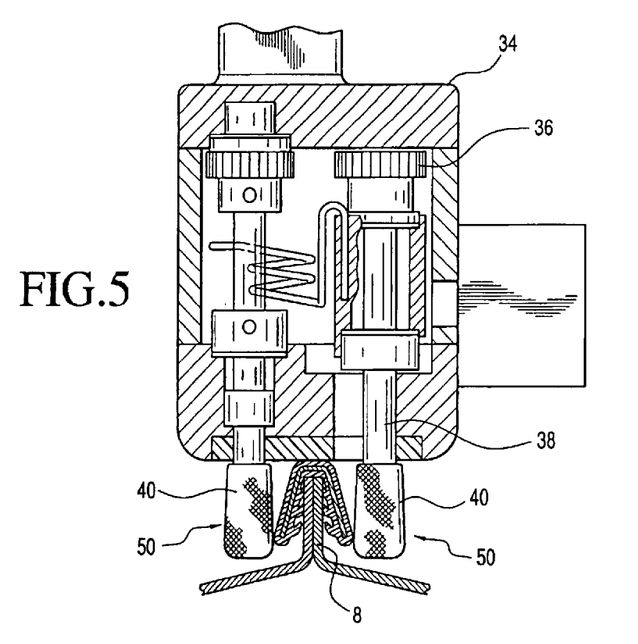
FIG. 5 is a cross sectional view of a roll forming tool with one roller having a moveable axis of rotation.
Figure 6:
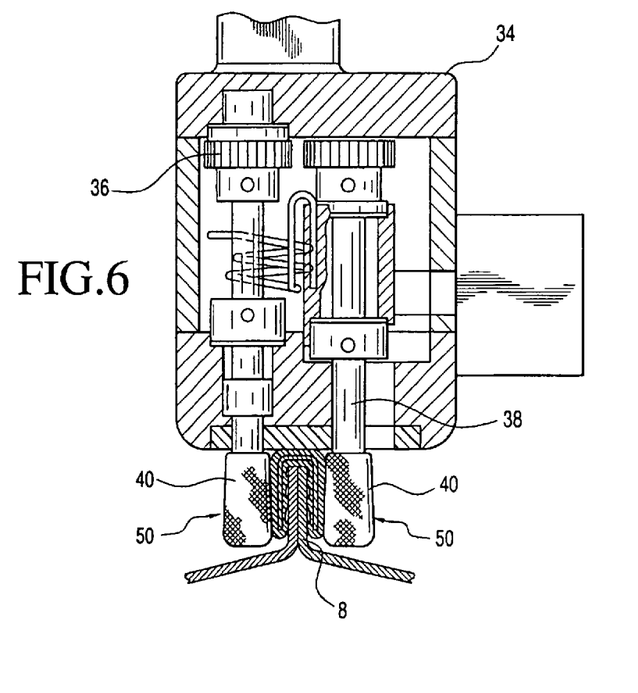
FIG. 6 is a cross sectional view of the roll forming tool of FIG. 5, with the moveable axis of rotation in a crimping position.
Figure 8:
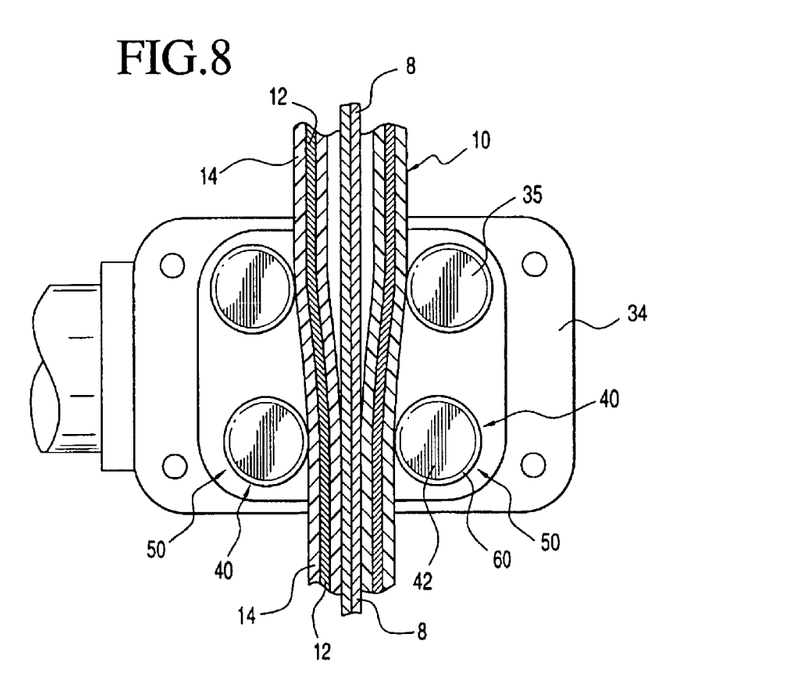
FIG. 8 is a bottom plan view showing fixed crimping rollers for guiding and crimping the flange engaging portion.
Figure 9:
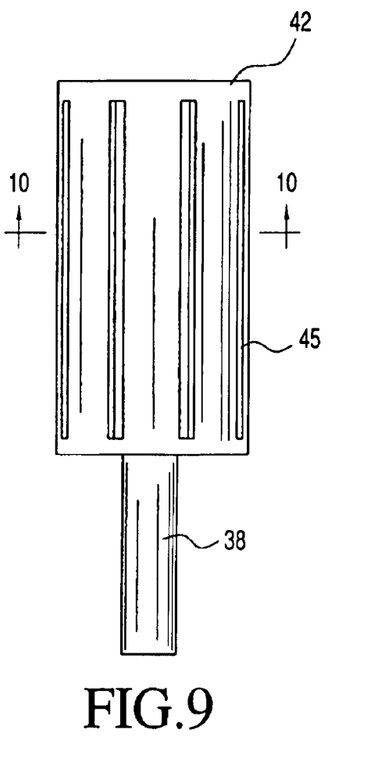
FIG. 9 is a side elevational view showing an outer surface of a drum.
Figure 10:
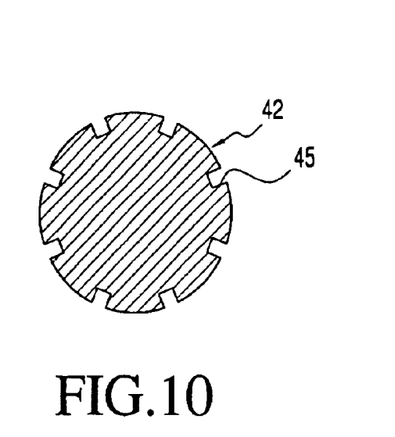
FIG. 10 is a cross sectional view taken along lines 10—10 of FIG. 9.
Figure 11:
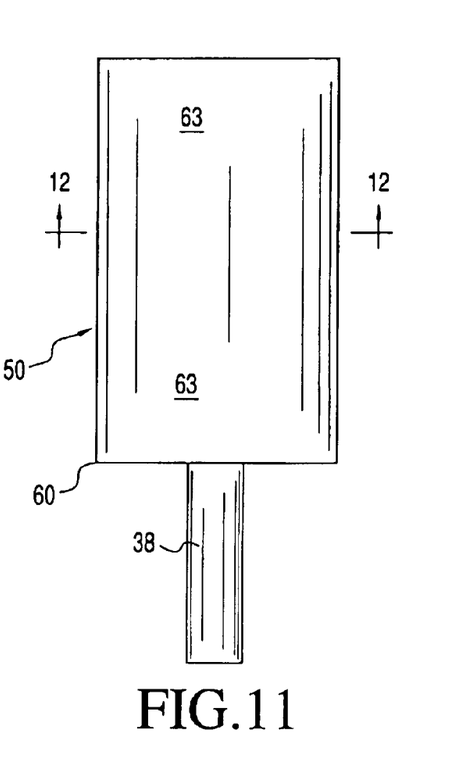
FIG. 11 is a side elevational view showing a sleeve configuration of the contact surface on the drum.

The flange cap 10 is originally presented to a flange 8 in an open condition shown in FIGS. 2, 5 and 8. The open condition allows an operator to easily position the flange cap 10 around the entire periphery of the vehicle opening and onto the flange 8 prior to fully securing the flange cap to the flange by means of the crimping tool 30. The open condition of the flange cap 10 is created by the leg portions of the generally U-shaped flange cap being initially formed at an angle greater than 90°.

To operably retain the flange cap 10 relative to the vehicle flange 8, the reinforcing member 12 of the flange cap is deformed to dispose the legs into a parallel or flange clinching position.

In various constructions, a sealing portion, a trim portion such as a lip or a finger may project from the flange cap 10. As seen in FIGS. 2,3,5,6 and 7, the flange cap 10 can also include an inner flange engaging surface having retaining fingers or ribs 16.

Figure 4:
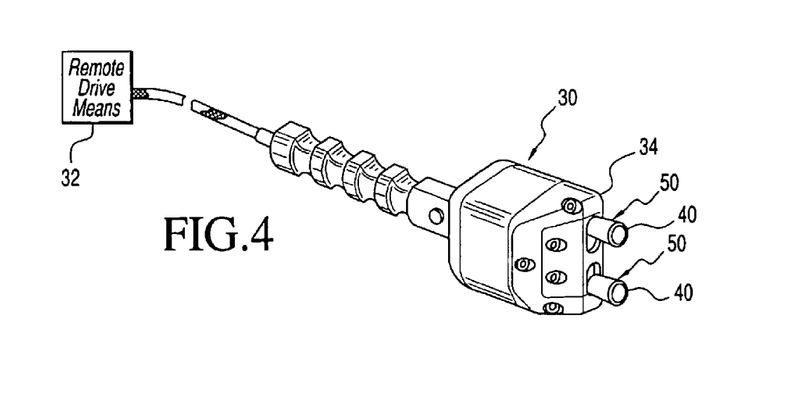
FIG. 4 is a perspective view of a typical roll forming tool, showing the crimping rollers.

Referring to FIG. 4, the roll forming tool 30 generally includes a motor 32 and at least two crimping rollers 40 incorporated into an operator compatible housing 34.

The motor 32 can be any of a variety of mechanisms including electrical, hydraulic, and pneumatic. Typically, the motor 32 is disposed in the housing 34 for manipulation by the operator. It is understood the operator can be a human operator or a robotic actuator. The motive force for the motor 32 can be provided by a supply line, as dictated by the specific type of motor employed.

The housing 34 can have any of a variety of configurations, including handle grips, handle orientations relative the crimping rollers and relative motion of the crimping rollers 40.

Further, the roll forming tool 30 includes gearing 36 for operably connecting the motor 32 to the crimping rollers 40. The gearing 36 can be any type of gearing used in the art and at least transmits the motive power from the motor 32 to the crimping rollers 40. The gearing 36 often includes or provides a drive shaft 38 for coupling to the crimping rollers 40.

Figure 7:
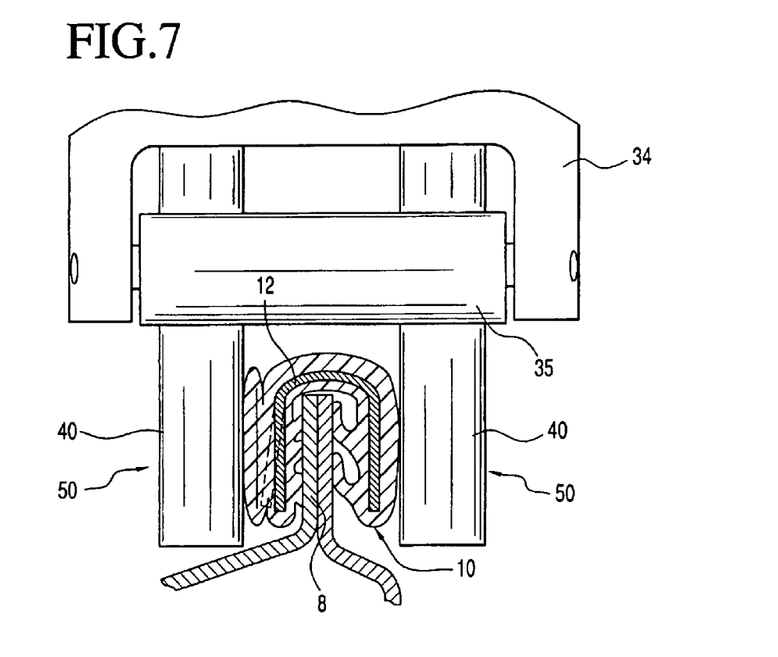
FIG. 7 is a partial cross sectional view showing the crimping rollers engaging a combined edge trim and weatherseal.

Referring to FIGS. 7 and 8, it is also contemplated the roll forming tool 30 can include a guide roller 35, or rollers, which can be cylindrical, concave, or convex for providing guidance of the crimping rollers 40 relative to a terminal end of the flanges 8. The guide roller(s) 35 are typically free rotating and thus are rotated by contact with the flange cap 10. Depending upon the configuration of the flange cap 10 and the flange 8, the roll forming tool 30 can employ one or more guide rollers 35, wherein the guide rollers may be disposed at any of a variety of inclinations with respect to the crimping rollers 40.

The crimping rollers 40 are used to apply a compressive force on at least one leg portion or both leg portions of the flange cap 10, when the rollers are activated and in a closed or crimping position.

Although FIGS. 7 and 8 show the crimping rollers as spaced and parallel rollers, wherein the guide roller 35 extends in a transverse direction, it is understood the crimping rollers and guide rollers can have any of a variety of configurations. The roll forming tool 30 can be configured to employ only a single crimping roller or only guide roller, as well as any combination of crimping and guide rollers. Thus, the roll forming tool 30 can include one, two, three or more rollers, with any combination of crimping and guide rollers. As seen in FIGS. 9–11 and 13–15, the rollers can have any of a variety of dimensions along the axis of rotation. That is, some rollers can have a length greater than a roller diameter, while other rollers can have a length less than a roller diameter.

Generally, each crimping roller 40 is disposed about a corresponding drive shaft 38 for rotation therewith. Typically, the drive shaft 38 is formed of a metal and selected to substantially preclude bending or bowing during anticipated operational forces, created during rotation about a respective drive axis.

The crimping roller 40 can be a substantially straight cylindrical shape. Alternatively, the crimping roller 40 can be a tubular structure. The crimping roller 40 can have a contoured longitudinal profile to match the contour of the flange 8 or the flange cap 10. Such contouring generally allows the crimping forces to be applied in a controlled manner to optimize deformation of the reinforcing member 12 within the flange cap 10. Such profiled crimping rollers 40 can be selected to assist in positively locating the crimping roller relative to a particular part of the flange cap 10 to improve accuracy and control of the roll forming tool 30. Thus, the crimping rollers 40 may have a distal end diameter greater than proximal end diameter.

It is also contemplated the crimping rollers 40 may be formed in more than one rolling part which are rotatable relative to each other but about the common axis of rotation (drive axis). For example, one part of a crimping roller 40 may be free running while an adjacent part may be driven so as to reduce frictional forces, which occur during deformation of the flange cap.

The crimping rollers 40 can be sized in accordance with the intended operating parameters of the roller. Typical crimping roller 40 diameters can range from slightly less than one inch, such as on the order of 0.8 inches to slightly over one inch, such as on the order of 1.2 inches.

Each crimping roller 40 includes a rigid drum 42 and a contact surface 50. The contact surface 50 can be at least partially defined by a contact sleeve 60.

The rigid drum 42 connected to the drive shaft 38 for rotation with the drive shaft about a drive axis. The drum 42 can be any of a variety of rigid materials, wherein metal, such as tool steel, has been found satisfactory. The drum 42 is constructed to preclude deformation of the drum during operation of the crimping roller 40. That is, under the intended operating conditions, the drum 42 does not deform, or flex by an amount that is materially significant when compared to the remaining components of the crimping roller 40. Thus, the drum 42 is non compliant. Although the drum 42 can have a variety of sizes, the drum having a radial thickness of approximately 0.1 to 0.2 inches is believed to be satisfactory. The diameter of the drum 42 can range from slightly less than an inch, such as on the order of 0.8 inches to slightly over an inch, such as on the order of 1.2 inches.

The drum 42 can be connected to the drive shaft 38 by a fixed or a compressible interconnection. In the fixed interconnection, the drum 42 maintains a fixed position relative to the drive shaft 38, even under loading. In contrast, referring to FIGS. 17–20, the compressible interconnection allows an offset or eccentricity of the drum 42 and the drive shaft 38 under loading.

For the fixed interconnection, the drum 42 can be connected to the drive shaft 38 by any of a variety of conventional mechanisms including friction fits, key ways, blind or threaded engagement, for rotation therewith. In either configuration of the connection, the shaft can have any of a variety of diameters, as required by intended operating parameters. A typical shaft diameter is approximately 0.4 inches, however, the specific diameter is at least partially determined by intended operating parameters.

As seen in FIGS. 17–20, for the elastic, resilient interconnection, a resilient inner core 44 connects the drive shaft 38 to an inner surface 41 of the drum 42. The inner core 44 can have any of a variety of configurations including flexible spokes, varying density resilient material, or cellular or foam construction. Foamed or expanded polymeric materials and compositions, including, but not limited to thermoplastic and thermoset materials as well as combinations thereof. Although the inner core 44 can have any of a variety of dimensions, depending upon the intended operating parameters, a radial thickness of approximately 0.1 to 0.3 inches is believed to be satisfactory, with a radial thickness of approximately 0.15 inches being preferred.

Thus, in the resilient elastic (offsetting) interconnection configuration, the drum 42 (and hence contact surface 50) can be disposed at varying distances from the drive shaft 38, depending upon the radial loading of the crimping roller 40. Therefore, while the distance between the drive shafts 38 of the two spaced crimping rollers 40 can be at a fixed distance, the distance between the contact surface of the crimping rollers 40 may vary in response to loading. At least a portion of the loading can result from variation in flange thicknesses and layers. Thus, the resilient, elastic interconnection allows the contact surface of the crimping rollers 40 to vary, without requiring movement of the corresponding drive shafts 38.

In this construction, the compliant or resilient core 44 is disposed about the drive shaft 38 to be intermediate the drive shaft and the inner surface 41 of the drum 42. The resilient, elastic compliant core 44 is selected to be nominally disposed in a concentric configuration with the rotatable drive shaft 38 and permit eccentric disposition of the drive shaft relative to the drum 42 in a crimping position.

The resilient, elastic compliant core 44 can be formed from any of a variety of materials that provide sufficient resiliency for the drum 42 to movement between the concentric position and the eccentric position with respect to the drive shaft 38. That is, the shaft 38 can be offset from the concentric position with the drum 42 by between approximately 0.03 to 0.1 inches, with a preferred offset of approximately 0.05 inches. Suitable materials for the compliant core 44 include including spring metal, thermoplastics, thermosets, composites and alloys. As at least partially determined by the specific construction and materials, the compliant core 44 can be solid or spoked. Further, the material of the compliant core 44 can be a sponge or cellular formation.

The desired offset can be formed by the compliant core 44 having a radial dimension of approximately ⅓ the diameter of the drum 42. Alternatively stated, the compliant inner core 44, may yield up to ⅓ the radial dimension of the inner core upon an operating compressive force.

It is understood the contact sleeve 60 can be either continuous or intermittent and employed with either the fixed or offsetting crimping rollers 40. It is further contemplated, the offsetting rollers can be employed without the contact sleeve 60, wherein the contact surface 50 is at least partially defined by the drum 42.

In a first configuration, the contact surface 50 of the crimping roller 40 is defined by the contact sleeve 60, which is connected to the drum 42. The contact sleeve 60 which forms the contact surface 50 of the crimping roller 40 can include a variety of configurations, including (i) a continuous surface and (ii) an intermittent surface. The contact sleeve 60 can be employed with a fixed drum and offset drum.

The material of the contact sleeve 60 is selected to provide sufficient friction to avoid slippage between the crimping roller 40 and the flange cap 10, while reducing marring of the surface of the flange cap upon slippage between the crimping tool 30 and the flange cap. Typical materials for the contact sleeve 60, include but are not limited to polymers including, but not limited to thermoplastics, thermosets and combinations thereof, wherein a satisfactory material is nylon. Thus, the contact surface 50 is defined by a different material than the drum 42.

Continuous Contact Sleeve

In the continuous contact sleeve configuration, the contact sleeve 60 can be connected to the drum 42 by either (i) molding or (ii) a releasable engagement between the contact sleeve and the drum. That is, the contact sleeve 60 can be integrally molded onto or about the drum 42, or the contact sleeve can be separately formed and subsequently attached to the drum. For example, the contact sleeve 60 could be an extruded component, which is subsequently attached to the drum 42 by adhesives, bonding, glues, ultrasonic welding or any other interconnection compatible with respective materials of the contact sleeve and the drum. The molding of the contact sleeve 60 to the drum 42 can be accomplished by a variety of techniques, including but not limited to dip coating, injection molding or casting.

Figure 13:
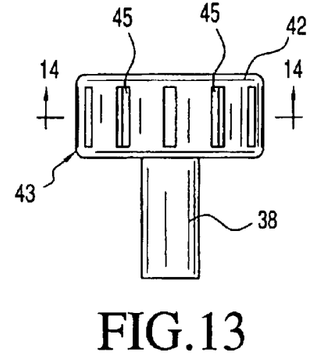
FIG. 13 is a side elevational view showing a cap configuration of the contact surface on the drum.
Figure 14:
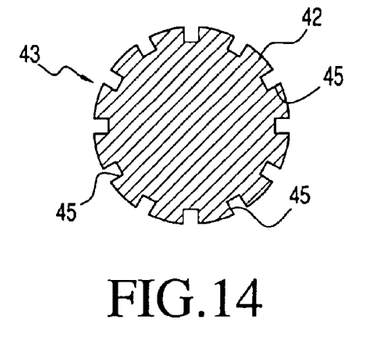
FIG. 14 is a cross sectional view taken along lines 14—14 of FIG. 13.
Figure 15:
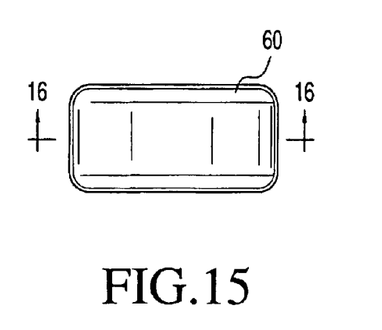
FIG. 15 is a side elevational view showing a cap for the drum.
Figure 16:
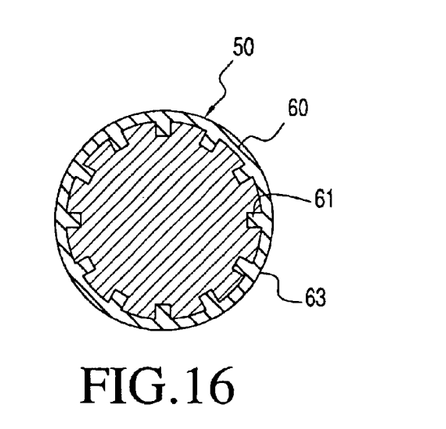
FIG. 16 is a cross sectional view taken along lines 16—16 of FIG. 15.
Figure 17:
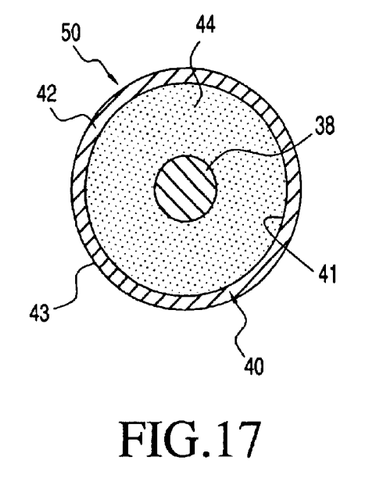
FIG. 17 is a cross sectional view of a drum connected to a drive shaft by a compliant resilient core in a concentric relation with the drum, such as in a non contacting position relative to the flange cap.
Figure 18:
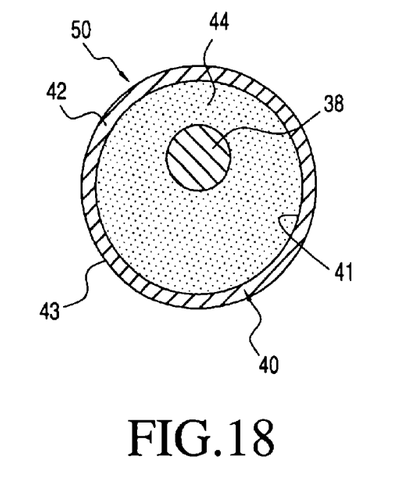
FIG. 18 is a cross sectional view of the drum connected to a drive shaft by a compliant resilient core of FIG. 17, in an offset relation, such as in a flange cap contacting position, wherein the amount of offset is exaggerated.
Figure 19:
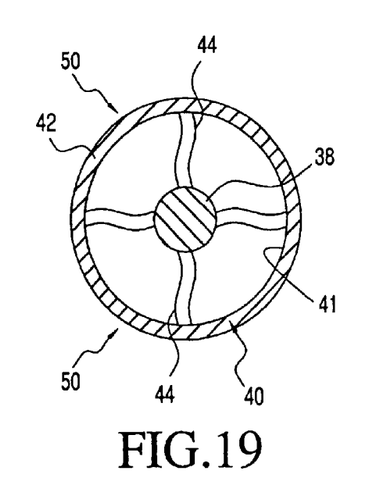
FIG. 19 is a cross sectional view of a drum connected to a drive shaft by a compliant resilient core in a spoke configuration in a concentric relation, such as the drum being in a non contacting position relative to the flange cap.
Figure 20:
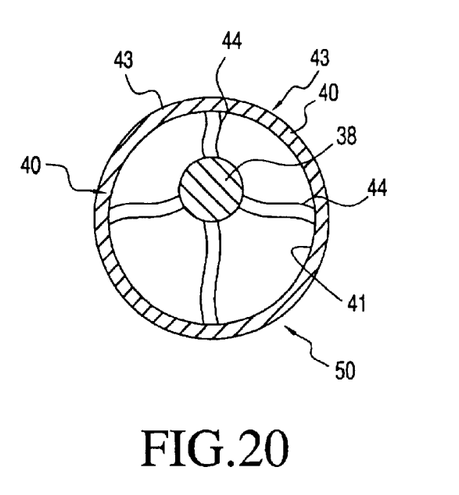
FIG. 20 is a cross sectional view of the drum connected to a drive shaft by a compliant resilient core in a spoke configuration of FIG. 19 in an offset relation, such as in a flange cap contacting position, wherein the amount of offset is exaggerated.

Referring to FIG. 13, an outer surface 43 of the drum 42 includes surface features such as recesses, grooves, slots or kerfs 45 for receiving and engaging a corresponding portion of the contact sleeve 60. The surface features can also include ribs, bumps or ridges, extending along any direction of the outer surface of the drum 42.

The contact sleeve 60 includes an inner surface 61 having corresponding features or structures for cooperatively engaging the surface features of the drum 42 to preclude rotation of the contact sleeve relative to the drum during operation.

Although a variety of surface contours and features can be employed, a plurality of grooves can be formed in the drum 42. The grooves 45 can extend either axially, circumferentially or helically with intermittent gaps. In forming this configuration, the drum 42 is etched, cast or machined to form the grooves, kerf or channels 45. It is understood the inner surface 61 of the contact sleeve 60 would include a corresponding structure.

In the molded sleeve configuration, the drum 42 having the grooves 45 is disposed in a mold and the material forming the contact sleeve 60 is introduced into the mold to bond to the drum and occupy the grooves. Upon sufficient curing, the drum 42 is removed from the mold. The crimping roller 40 thus has a drum 42 with a molded on contact sleeve 60, wherein the contact sleeve will rotate with the drum.

In the releasable engagement configuration of the contact sleeve 60, the contact sleeve is formed or cast in a mold to provide the desired dimensions for engaging the drum 42. The mold includes the features for forming the inner surface 61 of the contact sleeve 60 to engage the corresponding grooves 45 in the drum.

The contact sleeve 60 can be formed of polymers including, but not limited to thermoplastics, thermosets and combinations thereof, wherein nylon has been found satisfactory. In one configuration, the contact sleeve 60 has a radial thickness of approximately 0.02 to 0.1 inches, with a preferred radial thickness of approximately 0.05 inches. In one configuration, the features on the inner surface 61 of the contact sleeve 60 are sized on the order of 0.05 inches. However, the specific size of the features on the inner surface is at least partially dictated by the intended operating parameters and materials of construction. The contact sleeve 60 is preferably of sufficient hardness to preclude deformation upon crimping.

Intermittent Contact Sleeve

Figure 12:
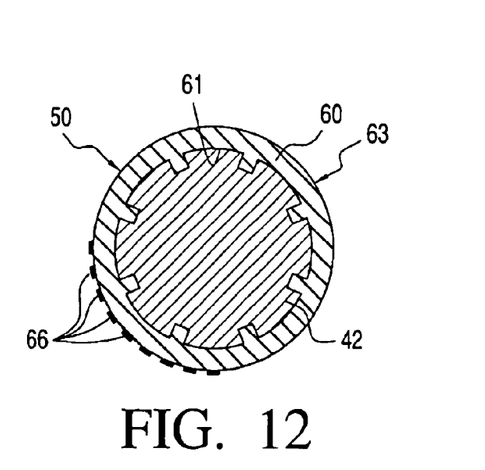
FIG. 12 is a cross sectional view taken along lines 12—12 of FIG. 11.

In the intermittent configuration of the contact sleeve 60, an outer surface 63 of the contact sleeve provides spaced contact points 66 between the sleeve and the flange cap 10. That is, the contact sleeve 60 has a plurality of relatively raised surfaces or portions 66 for contacting and engaging the flange cap 10. As seen in FIG. 12, a plurality of projections 66 are shown. Although the projections are disposed about the periphery of the contact sleeve, the projections in FIG. 12 are shown on approximately ¼ of the periphery for purposes of illustration.

It is understood either the molded or releasable engagement contact sleeves can include a contoured outer or contact surface. That is, the contact sleeve 60 can have a plurality of projections to contact and engage the flange cap 10. The projections can have any of a variety of configurations, including but not limited to, axial ribs, circumferential ribs, helical ribs, knurled, patterned or randomly disposed projections. Again, the contacting portions of the crimping roller 40 are thereby defined by a first material, such as a polymeric material, wherein the contact sleeve is formed of a different material than the supporting drum. The raised portions 66 can extend from an adjacent portion of the contact sleeve 60 by between approximately 0.02 inches to approximately 0.1 inch, with a preferred projection of approximately 0.05 inches.

Intermittent Contact Surface

Figure 21:
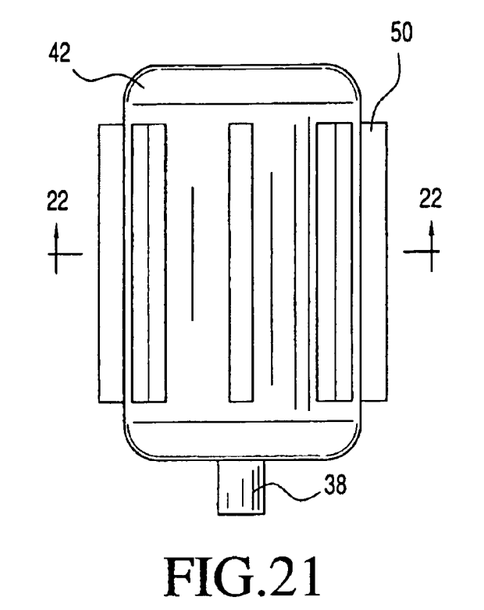
FIG. 21 is a side elevational view showing a crimping roller with an intermittent contact surface.
Figure 22:
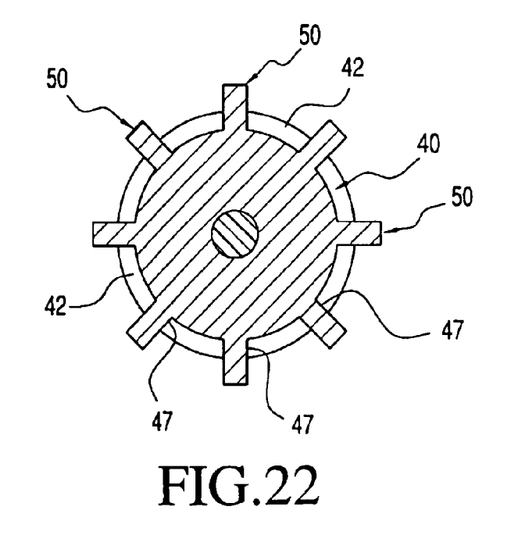
FIG. 22 is a cross sectional view taken along lines 22—22 of FIG. 21.

It is also understood the contact surface of the crimping roller 40 can be formed of the polymeric material, without requiring an entire sleeve, as seen in FIGS. 21 and 22. That is, the contacting projections can be formed to project from the drum 42, such that the outer surface of the drum, while having exposed portions, does not contact the flange cap 10 during operation of the roll forming tool 30. The projections can extend from an adjacent portion of the drum 42 by between approximately 0.02 inch to approximately 0.1 inch, with a preferred projection of approximately 0.05 inches.

The contacting projections 66 can have any of a variety of configurations including, but not limited to axial ribs, circumferential ribs, helical ribs, knurled, patterned or randomly disposed projections. It is understood the contacting projections are exaggerated in FIG. 22 for purposes of illustration. In addition, terminal ends of the projections 66 can have any of a variety of shapes, such as rounded, curved, angular or faceted, as at least partially dictated by the intended operating parameters of the rollers and the materials of the flange cap.

In formation, the drum 42 can be formed with a central recess and a plurality of radially extending apertures 47. The drum 42 is disposed in a mold and the material forming the contacting projections is disposed in the mold to travel through the central recess of the drum and extend radially outward through the radial apertures 47. The mold includes corresponding structure to define the outer surface of the contacting projections, thereby forming the contacting projections of the contact surface.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

In the claims:

1. In a roll forming tool for installing a flange cap on a flange of a vehicle, the improvement comprising an offsetting roller for contacting the flange cap, the offsetting roller including:
   (a) a drive shaft;
   (b) an elastically compressible resilient core disposed about the drive shaft for rotation therewith; and
   (c) a rigid drum connected to the elastically compressible resilient core for rotation therewith, the elastically compressible resilient core selected to dispose the first drive shaft and the rigid drum between a concentric position and an eccentric position in response to operable contact of the offsetting roller and the flange cap.

2. The roll forming tool of claim 1, further comprising a sleeve disposed on the rigid drum to contact the flange cap upon operable engagement of the roll forming tool with the flange cap.

3. The roll forming tool of claim 2, wherein the sleeve is bonded to the rigid drum.

4. The roll forming tool of claim 2, wherein the sleeve is polymeric.

5. The roll forming tool of claim 1, wherein the rigid drum includes a contoured outer surface.

6. The roll forming tool of claim 5, further comprising a sleeve disposed on the rigid drum, wherein the sleeve includes a contoured inner surface to engage the contoured outer surface of the rigid drum.

7. The roll forming tool of claim 1, further comprising a sleeve surrounding the rigid drum, the sleeve having a closed end.

8. The roll forming tool of claim 1, wherein the elastically compressible resilient core includes a plurality of spokes.

9. The roll forming tool of claim 1, wherein the elastically compressible resilient core includes a cellular structure.

10. The roll forming tool of claim 1, further comprising a plurality of polymeric projections extending from an outer surface of the rigid drum.

11. The roll forming tool of claim 1, further comprising a second roller spaced from the offsetting roller to dispose a portion of the flange cap between the offsetting roller and the second roller.

12. The roll forming tool of claim 1, wherein the offsetting roller is a crimping roller.

13. The roll forming tool of claim 1, wherein the offsetting roller is a guide roller.

14. The roll forming tool of claim 1, wherein the offsetting roller is driven.

15. The roll forming tool of claim 1, wherein the offsetting roller freely rotates.

16. In a roll forming tool for installing a flange cap on a flange of a vehicle, the improvement comprising:
   (a) a first roller for rolling engagement with the flange cap, the roller having an outer surface, the outer surface including a plurality of surface features; and
   (b) a polymeric sleeve disposed about at least a portion of the outer surface of the first roller for contacting the flange cap in rolling engagement of the tool and the flange cap, the polymeric sleeve having an inner surface with corresponding surface features to cooperatively engage the surface features on the outer surface of the first roller.

17. The roll forming tool of claim 16, wherein the polymeric sleeve defines a plurality of outwardly extending projections defining a contact surface between the roller and the flange cap.

18. The roll forming tool of claim 16, wherein the first roller is a crimping roller.

19. The roll forming tool of claim 16, wherein the first roller is a guide roller.

20. The roll forming tool of claim 16, further comprising a second roller spaced from the first roller to locate a portion of the flange cap therebetween.

21. The roll forming tool of claim 16, wherein the first roller is driven.

22. The roll forming tool of claim 16, wherein the first roller freely rotates.

23. The roll forming tool of claim 16, wherein the polymeric sleeve includes a closed end.

24. A roll forming tool for engaging a flange cap with a vehicle flange, the tool comprising:
   (a) at least one roller for rolling contact with the flange cap as the flange cap engages the flange; and
   (b) a plurality of polymeric projections extending from the roller to at least partially define a contact surface between the roller and the flange cap.

25. The roll forming tool of claim 24, wherein the roller is formed of a different material than the polymeric projections.

26. The roll forming tool of claim 24, wherein the polymeric projections are connected to a polymeric sleeve on the roller.

27. The roll forming tool of claim 24, wherein the roller is formed of metal.

28. The roll forming tool of claim 24, further comprising a polymeric sleeve with contoured inner surface, and the roller has a corresponding contoured outer surface.

29. The roll forming tool of claim 24, wherein the roller includes a drum having a plurality of radially directed apertures; and the plurality of polymeric projections extend through the plurality of radial apertures, the projections sized to contact the flange cap in operation of the roll forming tool.

30. A roll forming tool for installing a flange cap on a flange of a vehicle, comprising:
   (a) a first roller for rolling engagement with the flange cap, the first roller including a drum having a plurality of radially directed apertures; and
   (b) a plurality of polymeric projections extending through the plurality of radial apertures, the projections sized to contact the flange cap in operation of the roll forming tool.

31. The roll forming tool of claim 30, wherein the drum is metallic.

* * * * *